(12) United States Patent
Kim et al.

(10) Patent No.: US 8,781,296 B2
(45) Date of Patent: Jul. 15, 2014

(54) AUDITING SYSTEM FOR MISUSE OF AN IMAGE INFORMATION

(75) Inventors: Won-Kug Kim, Andong (KR); Jin-Kyo Shin, Seongnam (KR)

(73) Assignee: 4Dream Co., Ltd., Andong-Si, Gyeongsangbuk-Do (KR)

( * ) Notice: Subject to any disclaimer, the term of this patent is extended or adjusted under 35 U.S.C. 154(b) by 0 days.

(21) Appl. No.: 13/994,037

(22) PCT Filed: Dec. 8, 2011

(86) PCT No.: PCT/KR2011/009443
§ 371 (c)(1),
(2), (4) Date: Jun. 13, 2013

(87) PCT Pub. No.: WO2012/081857
PCT Pub. Date: Jun. 21, 2012

(65) Prior Publication Data
US 2013/0279880 A1    Oct. 24, 2013

(30) Foreign Application Priority Data
Dec. 14, 2010   (KR) .......................... 10-2010-0127656

(51) Int. Cl.
*H04N 5/92*   (2006.01)
*G11B 27/10*   (2006.01)

(52) U.S. Cl.
CPC .................................... *G11B 27/105* (2013.01)
USPC ........................................................... 386/239

(58) Field of Classification Search
CPC ...................... G11B 27/105; G11B 2220/2562;
G11B 27/329; H04L 63/12; H04L 63/123;
H04L 9/3294; H04L 9/3281; H04L 9/32;
H04L 21/8358; H04L 5/85; H04L 1/32144;
H04L 9/8042; H04L 2201/3233
USPC ........................................................ 386/239
See application file for complete search history.

(56) References Cited

U.S. PATENT DOCUMENTS

| 2005/0234909 A1* | 10/2005 | Bade et al. .......................... 707/8 |
| 2007/0031010 A1* | 2/2007 | Sukegawa et al. ............. 382/118 |
| 2008/0174485 A1* | 7/2008 | Carani et al. ............. 342/357.07 |
| 2010/0146282 A1* | 6/2010 | Echizen et al. ................ 713/176 |
| 2010/0211826 A1* | 8/2010 | Villella et al. .................... 714/39 |
| 2012/0113265 A1* | 5/2012 | Galvin ........................... 348/159 |
| 2012/0296870 A1* | 11/2012 | Fu et al. ......................... 707/625 |

FOREIGN PATENT DOCUMENTS

| KR | 10-2005-0031817 A | 4/2005 |
| KR | 10-0596916 B1 | 7/2006 |
| KR | 10-0605621 B1 | 7/2006 |
| KR | 10-0822017 B1 | 4/2008 |
| KR | 10-2009-0027578 A | 3/2009 |
| KR | 10-2009-0090641 A | 8/2009 |
| KR | 10-2009-0101332 A | 9/2009 |
| KR | 10-2009-0111030 A | 10/2009 |

* cited by examiner

*Primary Examiner* — Thai Tran
*Assistant Examiner* — William Tran
(74) *Attorney, Agent, or Firm* — Novick, Kim & Lee, PLLC; Sang Ho Lee

(57) ABSTRACT

The present invention relates to a system for auditing misuse of an image information, and more particularly, to a system for auditing misuse of an image information, which stores the image information recorded by an image recording device as a file; transmits a log which is related to suspected misuse to the stored file to an auditing server in order to determine whether the stored file was misused; transmits information as to whether a user's access log to the stored file, an image deletion log, an image copy log, and an image view log have been modified to the auditing server; determine whether misuse occurred in view of a misuse behavior pattern; and in a case that misuse occurs generates misuse alarm data thereby notifying a user's terminal of such misuse.

7 Claims, 2 Drawing Sheets

AUDITING SYSTEM FOR MISUSE OF AN IMAGE INFORMATION

BACKGROUND OF THE INVENTION

1. Field of the Invention

The present invention relates to an auditing system for misuse of an image information, and more particularly, to an auditing system for misuse of the image information, which stores the image information recorded by an image recording device as a file; transmits a log which is related to suspected misuse behaviors to the stored file to an auditing server in order to determine whether the stored file was misused; transmits information as to whether a user's access log to the stored file, an image deletion log, an image copy log, and an image view log have been modified to the auditing server; determines whether misuse occurred in view of a misuse behavior pattern; and in a case that misuse occurs generates misuse alarm data thereby notifying a user's terminal of such misuse.

2. Description of the Related Art

According to CCTV Installation and Operation Guidelines, "[a] principal must designate an area to browse and to play image information received from a CCTV as a restricted area and control entry and exit of an unauthorized person strictly from the area. An authority to access image information obtained by the CCTV is limited to a supervisor and the least personnel designated by the principal. The principal must carry out a regular inspection to determine whether the CCTV is functioning, and must maintain correct records of the inspection. The principal must take a technical/operational safety measure to prevent an illegal access to image information, a modification, outflow or damage of image information." The guidelines also state, "[i]mage information obtained by the CCTV should be deleted immediately after the expiration of the storage period that the regulation specifies. However, when it is difficult to determine the minimum period required to achieve the storage purpose, then the storage period should be within thirty days of obtaining image information."

In addition, CCTV Operation Guidelines of Public Institutions state, "[t]he head of an organization must take a safety measure to prevent a loss, theft, outflow, modification, or damage of image information when the image information is handled or transmitted through information communication networks under the Article 2, Subsection 7 of the Electronic Government Act. The head may depute a handling of image information to a specialized institution or agency. In this case, the head of an organization must take a safety measure to prevent a loss, theft, outflow, modification, or damage of image information." The guidelines also state that "[i]mage information obtained by the CCTV should be deleted immediately after the expiration of the storage period that the regulation specifies. However, when it is difficult to determine the minimum period required to achieve the storage purpose due to a feature of the institution, then the storage period should be within thirty days of obtaining image information."

However, the misuse of private image information is caused by an outflow of image information stored in an image recording device installed for public purposes. This has led the public to feel that they have been victimized and to file a civil complaint. Thus, there should be a minimum operational measure to prevent an invasion of privacy at a private space and to obtain public image information.

A prior art, Korean Patent Publication No. 10-2009-0090641 describes a system for active security surveillance, which is a typical system for monitoring. The system for active security surveillance is installed to a home gateway of a home network system. The system monitors data which is transmitted to the outside of the network or received from the outside of the network. The system comprises an intrusion detecting unit, an event controller, a threat controller and a database. An intrusion detecting unit detects the illegal intrusion by comparing the data packet information received from the outside of the network with the intrusion pattern information stored in the database. The intrusion detecting unit blocks the detected intrusion and generates and transmits the intrusion detection/block event log to an event controller. A threat controller monitors the network flow, detects an anomaly, and analyzes the detected anomaly. The threat controller produces the analyzed information to the event log, and transmits the event log to the event controller. The event controller integrally processes the event log received from the intrusion detecting unit and the threat controller. A database stores the intrusion pattern information and the information processed in the event controller.

The system of the first prior art can detect and handle the illegal intrusion. However, it cannot extract the behavior pattern suspected of the misuse of the image information.

Korean Patent No. 10-0822017 describes an intelligent monitoring system and a method thereof. The system comprises a camera unit, a central monitoring unit, a remote place monitoring unit, a network unit, an image reception processing unit and an image variation sensing unit. A camera unit includes a pan/tilt/zoom camera and one or more sub cameras for photographing a monitored region without a dead zone. A central monitoring unit transmits a driving control signal for the camera unit and an image association control signal, for information about the image photographed by the camera unit, through a communication interworking apparatus. A remote place monitoring unit controls the camera unit by receiving the driving control signal and the image association control signal from the central monitoring unit through the communication interworking apparatus, associates the photographed images, and stores and transmits the photographed and associated images. A network unit confirms images, which is photographed or being photographed by the camera unit, through internet and monitors and controls the images in real time. An image reception processing unit receives and processes images transmitted from the remote place monitoring unit. An image variation sensing unit senses the object operation variation of a predetermined amount or more through a motion sensor connected with the sub camera while the sub camera photographs the monitored region.

The system of the prior art solved a problem regarding the identification of a subject when images were photographed from a remote place and stored in the image reception processing unit at once. However, it cannot extract the behavior pattern suspected of the misuse of the images.

Although there are many other monitoring systems other than prior arts stated above, there were no technologies having an agent installed in the image recording device that can obtain data for the purpose of determining whether the image was misused. Also no disclosures reveal an auditing server that uses the collected data to determine whether the image was misused.

SUMMARY OF THE INVENTION

Thus, the present invention is devised to solve the above-mentioned problems and to prevent misuse of an image information stored in an image recording device, by immediately notifying a user of data subject to the misuse.

One of embodiments of the present invention is an auditing system for misuse of an image information.

The auditing system includes an image recording device recording the image information, storing the recorded image information as a file, generating a modification data determined whether a modification to the file occurred, and having an agent generating an image information log including an event data that records misuse behaviors to the stored image information, and an auditing server receiving the modification data, generating a misuse alarm data when the modification occurs, receiving the image information log, generating the misuse alarm data when the event data is compared with and corresponds to a predetermined misuse condition data.

As stated above, the present invention has advantages preventing from the misuse of an image information file stored for public purposes in advance by securing evidence; maintaining image information safely by ensuring that the image information is both accurate and latest; guaranteeing the right of an owner of the image information; tracing misuse conducts and illegal means; and standardize procedures and methods for maintaining image data

| [Explanation of reference number] | |
|---|---|
| 100: image record device | 110: camera device |
| 200: auditing server | 210: receiving unit |
| 220: storing unit | 230: misuse condition database |
| 240: control unit | 250: standard time interlock module |

DETAILED DESCRIPTION OF THE PREFERRED EMBODIMENTS

Detailed description will be made of preferred embodiments of the present invention with reference to the accompanying drawings.

Figure 1:
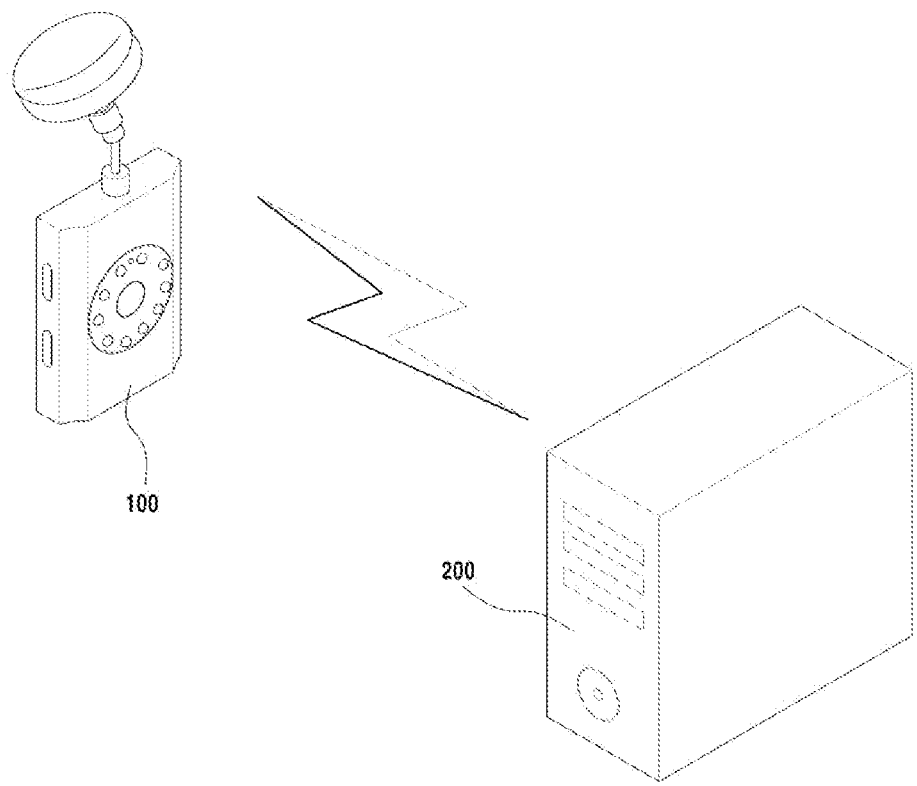
FIG. 1 is a schematic illustration of an exemplary auditing system for misuse of an image information according to an embodiment of the present invention.

FIG. 1 is a schematic illustration of an exemplary auditing system for misuse of an image information according to an embodiment of the present invention. As shown in FIG. 1, the auditing system for misuse of an image information comprises an image recording device 100 and an auditing server 200.

More specifically, the image recording device 100 records an image information and the recorded image information is stored as a file. Modification data is generated after determining whether the file was modified and an agent is installed in the image recording device 100 and concurrently generates an image information log, including an event data regarding misuse behaviors with respect to the stored image.

The agent checks a hash value of the image information which is recorded and stored as the file. Then the agent generates the modification data in a case of detecting the change of the hash value.

In other words, if the file was deleted, the agent can detect the disappearance of the file because the disappearance of the file means that the image is modified. An increase or decrease of a size of the file or a change of the file content without changing the size of the file also means the modification of the image information. The modification data indicates whether the image information is modified or not.

If an unauthorized user intends to delete the file, the unauthorized user's conduct causes an event. Then the agent generates the image information log, including an event data.

According to the preferred embodiment, the image recording device 100 in which the agent is installed is either a Digital Video Recorder (DVR) or a Network Video Recorder (NVR).

Moreover, the image recording device 100 further includes a camera device 110 to identify a user accessing directly to the file not via a network.

The camera device 110 captures an image of a person attempting to approach the stored file in order to identify as to whether the person is authorized to approach the stored file or not. An image captured by the camera device 110 is transmitted to the auditing server 200.

The auditing server 200 receives the modification data from the image record device 100. The auditing server 200 generates the misuse alarm data when a modification occurs because such modification is regarded as the misuse.

The misuse of an image information means that the hash value of the image information has changed, that is, the image information is modified. Accordingly, if an unauthorized person or an illegal network user modifies the image information, the auditing server 200 generates the misuse alarm data because it regards such modification as the misuse.

In addition, the auditing server 200 receives the image information log, including an event data from the image recording device 100. Then the auditing server 200 compares the event data with a pre-stored misuse condition data in order to determine whether the stored image information was misused. The auditing server 200 generates a misuse alarm data if the event data corresponds to the predetermined misuse condition data.

Figure 2:
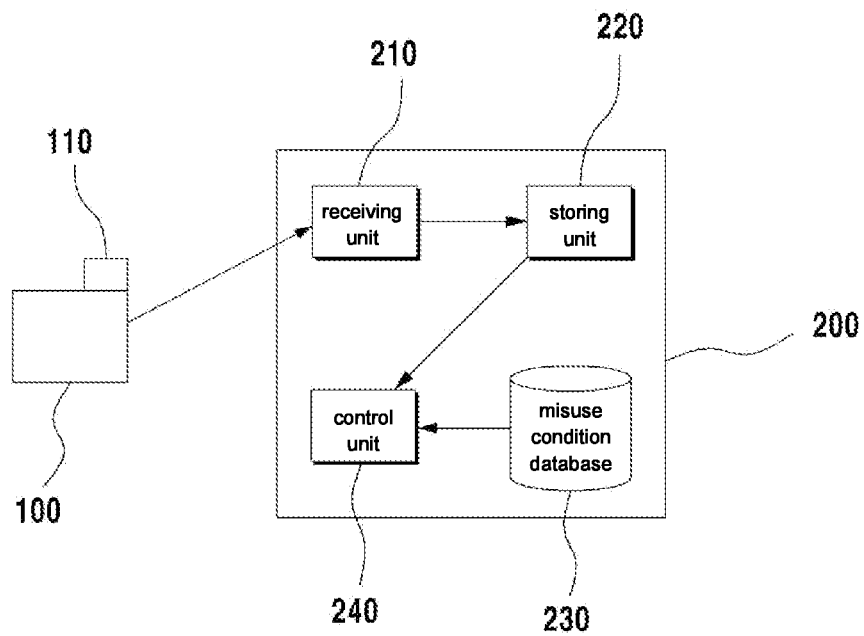
FIG. 2 is a block diagram of the auditing system for misuse of an image information according to an embodiment of the present invention.

More particularly, as shown in FIG. 2, the auditing server 200 includes a receiving unit 210, a storing unit 220, a misuse condition database 230, and a control unit 240.

Figure 3:
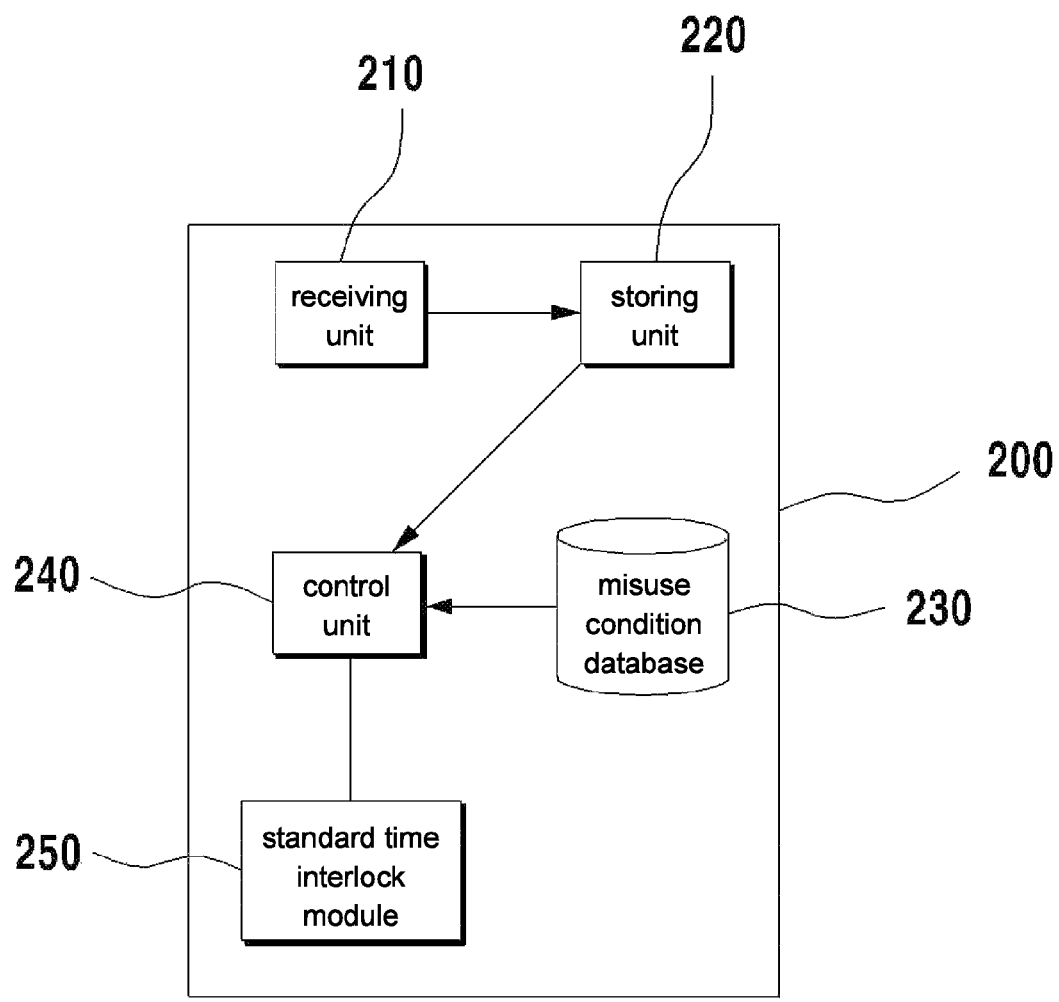
FIG. 3 is a block diagram of the auditing system for misuse of an image information according to another embodiment of the present invention.

More preferably, as show in FIG. 3, the auditing server further includes a standard time interlock module 250 in addition to a receiving unit 210, a storing unit 220, a misuse condition database 230, and a control unit 240.

The receiving unit 210 receives the modification data and the image information log from the image recording device 100.

The storing unit 220 stores the modification data and the image information log in a readable and unwritable storage medium such as the Write Once Read Many (WORM) type storage medium.

The storing unit 220 operates in a write-once, read-many mode, which can be used as a ground whether the misuse is occurs.

The original file received from the agent is stored in the storing unit 220 without any changes in order to analyze the accurate image information log in the file.

The misuse condition database 230 of the auditing server 200 includes the predetermined misuse condition data, which is compared with the image information log in order to determine whether the image information is misused.

In other words, the misuse condition database 230 is included to determine the misuse of the image information in a case that at least a portion of the event data corresponds to the predetermined misuse condition data.

The misuse condition database includes the predetermined misuse condition data including at least one of the following cases: an attempt to watch the image information in which a storage period for the image information expires, an attempt to damage, modify or delete the image information despite that such attempt occurs within the storage period for the image information, an attempt to illegally copy the image information, an attempt to remotely transmit the file, a transmission of a large volume of the image information in a short period time, an access to the image recording device via a network from an IP address, wherein the IP address falls in unauthorized bandwidth, an access to the image recording device not within working hours, an access record to the image recording device not from an authorized terminal(IP) but from other equipment, a deletion of a basis of a log record for image auditing or an access to the image recording device from a different IP address than one that has been used for connection.

In particular, the access from a different IP address than one that has been used for such connection includes a case that the user, who has connected to the image record device from his/her computer having a same IP address, accesses to the image record device from other's computer having a different IP address. Such case is also considered as the misuse.

The control unit 240 compares the event data included in the image information log with the predetermined misuse condition data stored in the misuse condition database 230. The control unit 240 generates the misuse alarm data if the event data corresponds to the predetermined misuse condition data, includes information for an occurrence of the misuse to the image information log, and stores the image information log again.

If the event data does not correspond to the misuse condition data, the control unit includes a comparison information made between the event data and the predetermined misuse condition data in the image information log, and store the information for making the comparison in the storing unit 220.

For example, when the receiving unit 210 of the auditing server 200 receives event information that someone attempts to delete the file by accessing to the image recording device 100, the control unit 240 compares the event information with the predetermined misuse condition data stored in the misuse condition database 230. If the event information corresponds to the predetermined misuse condition data, it is determined that the misuse occurs.

Furthermore, the auditing server 200 transmits the misuse alarm data to a user's terminal device. The user's terminal device can receive information regarding the misuse via a SMS message or through an online medium.

The control unit 240 sets a storage period with respect to the modification data saved in the storing unit 220 and the image information log, and automatically delete the modification data and the image information log when the storage period set by the control unit 240 expires.

Even though both the modification data and the image information logs which are stored in the storing unit 220 are readable and unwritable, it is preferred to delete both the modification data and the image information log after the storing period set by the control unit 240 expires because the auditing server 200 has a limited storage space to store.

The image captured by the camera device 110 is also stored in the storing unit 220 in order to identify a person misused the image information.

The control unit 240 further includes a search module.

The image information log file continuously received from the agent, installed in the image recording device 100, at real time is stored in the storing unit 220 as an original file without any changes in order to analyze the accurate image information logs in the file. The search module is included in order for a fast file search of the desired image information log among a large volume of file, and in order for an analysis on the image information log in the file.

The control unit 240 determines whether the image information is misused or not by analyzing the image information log which is searched by the search module.

For example, in a case that Gil-Dong Hong often accesses the image recording device 100 and browses the image information, if the keyword, "Gil-Dong Hong" is put into a search engine of the search module, the search results provide all of image information logs accessed by Gil-Dong Hong. And the search module further searches the image information logs to detect the misuse of the image information.

The control unit 240 automatically generates an auditing report in a Hangul document format or in a Microsoft Excel document format.

According to the preferred embodiment, the auditing server 200 can further include a standard time interlock module 250, which was explained in a singular example, each of the modification data and the image information log from a plurality of the image recording devices can be received at a reference time which is applied to the plurality of the image recording devices, since each of the plurality of the image recording devices can have a different time set in the process of receipt for the modification data and the image information log from the plurality of the image recording devices.

Although the present invention has been specifically described herein with reference to the foregoing embodiments, the scope of the present invention is not limited to the embodiments.

Needless to say, it is to be understood that various modifications and substitutions may be made by those skilled in the art without departing from the novel spirit and scope of the invention.

What is claimed is:

1. An auditing system of misuse of an image information comprising:
   a first image recording device recording the image information, and storing the recorded image information as a file,
   a second image recording device recording an image of a person who approaches toward the first image recording device in order to determine whether the person is authorized to access to the first image recording device, wherein the image of the person captured by the second image recording device is transmitted to an auditing server,
   an agent located in the first image recording device, said agent is configured to check a change of a hash value of the image information, a change of a size of the file, and a change of the file content without changing the size of the file, and said agent generates a modification data if any one of changes to the hash value, the size of the file, and the file content is detected, and the agent monitors a plurality of behaviors to detect misuse and generates an image information log including an event data that records any detected misuse behavior to the stored image information; and
   the auditing server comprising,
      a receiving unit receiving the modification data and the image information log;
      a storing unit storing the modification data and the image information log;

a misuse condition database storing the predetermined misuse condition data whether the misuse occurs by a comparison with the image information log can be determined; and a control unit being operative to compare the event data with the predetermined misuse condition data, generating the misuse alarm data if the event data included in the image information log is compared with and corresponds to the predetermined misuse condition data, further including information of such misuse occurrence in the image information log, and storing the image information log with the information of such misuse occurrence, or if the event data does not corresponds to the predetermined misuse condition data, including information that the misuse comparison has been conducted in the image information log, and storing the image information log in the storing unit, the auditing server receiving the modification data from the image recording device, generating a misuse alarm data when the modification occurs, receiving the image information log, generating the misuse alarm data when the event data that records the misuse behavior in the image information log is compared with all of predetermined misuse condition data, and a portion of the image information log corresponds to the predetermined misuse condition data, the predetermined misuse condition data includes the following cases:

an attempt to watch the image information in which a storage period for the image information expires;

an unauthorized attempt to copy the image information;

an attempt to remotely transmit the file; and a transmission of a number of the image information that is greater than a predetermined number of transmission made within a predetermined time, wherein the auditing server stores the modification data and image information log in a Write Once Read Many (WORM) format so that misuse can be detected if there are any change to at least one of modification data and image information log.

2. The auditing system according to claim 1, further comprising a standard time interlock module so that each of the modification data and the image information log from a plurality of the image recording devices is received at a reference time which is applied to the plurality of the image recording devices, since each of the plurality of the image recording devices may have a different time set in the process of receipt for the modification data and the image information log from the plurality of the image recording devices.

3. The auditing system according to claim 1, wherein the control unit comprises a search module in order for file search when the file having the image information log continuously received at real time from the image recording device becomes a large volume, wherein the search module analyzes the image information log included in the searched file, and further searches the image information log determined as the misuse of the image information.

4. The auditing system according to claim 1, wherein the agent is installed in either a Digital Video Recorder (DVR) or a Network Video Recorder (NVR).

5. The auditing system according to claim 1, wherein the predetermined misuse condition data comprises an access to the image recording device not within working hours.

6. The auditing system according to claim 1, wherein the predetermined misuse condition data comprises a deletion of a basis of a log record for image auditing.

7. An auditing system of misuse of an image information comprising:

a first image recording device recording the image information, and storing the recorded image information as a file, a second image recording device recording an image of a person who approaches toward the first image recording device in order to determine whether the person is authorized to access to the first image recording device, wherein the image of the person captured by the second image recording device is transmitted to an auditing server, an agent located in the first image recording device, said agent is configured to check a change of a hash value of the image information, a change of a size of the file, and a change of the file content without changing the size of the file, and said agent generates a modification data if any one of changes to the hash value, the size of the file, and the file content is detected, and the agent monitors a plurality of behaviors to detect misuse and generates an image information log including an event data that records any detected misuse behavior to the stored image information; and the auditing server comprising, a receiving unit receiving the modification data and the image information log;

a storing unit storing the modification data and the image information log;

a misuse condition database storing the predetermined misuse condition data whether the misuse occurs by a comparison with the image information log can be determined; and a control unit being operative to compare the event data with the predetermined misuse condition data, generating the misuse alarm data if the event data included in the image information log is compared with and corresponds to the predetermined misuse condition data, further including information of such misuse occurrence in the image information log, and storing the image information log with the information of such misuse occurrence, or if the event data does not corresponds to the predetermined misuse condition data, including information that the misuse comparison has been conducted in the image information log, and storing the image information log in the storing unit, the auditing server receiving the modification data from the image recording device, generating a misuse alarm data when the modification occurs, receiving the image information log, generating the misuse alarm data when the event data that records the misuse behavior in the image information log is compared with all of predetermined misuse condition data, and a portion of the image information log corresponds to the predetermined misuse condition data, the predetermined misuse condition data includes the following cases:

an attempt to watch the image information in which a storage period for the image information expires;

an unauthorized attempt to copy the image information;

an attempt to remotely transmit the file; and a transmission of a number of the image information that is greater than a predetermined number of transmission made within a predetermined time, wherein the auditing server stores the modification data and image information log in a Write Once Read Many (WORM) format so that misuse can be detected if there are any change to at least one of modification data and image information log, wherein the auditing system comprises a standard time interlock module so that each of the modification data and the image information log from a plurality of the image recording devices is received at a reference time which is applied to the plurality of the image recording devices, since each of the plurality of the image recording devices may have a different time set in the process of receipt for the modification data and the image information log from the plurality of the image recording devices, wherein the control unit comprises a search module in order for a file search when the file having the image information log continuously received at real time from the image recording device becomes a large volume, wherein the search module analyzes the image information log included in the searched file, and further searches the image information log determined as the misuse of the image information, wherein the agent is installed in either a Digital Video Recorder (DVR) or a Network Video Recorder (NVR), wherein the auditing server transmits the misuse alarm data to a user's terminal device via a SMS message, and wherein the control unit is configured to generate an auditing report.

\* \* \* \* \*